No. 897,645. PATENTED SEPT. 1, 1908.
A. B. McLEAN.
CLIP.
APPLICATION FILED AUG. 26, 1907.

Witnesses
Fred A. Schlosser.
David J. Davies

Inventor
Andrus B. McLean

By John H. Cross
his Attorney

UNITED STATES PATENT OFFICE.

ANDRUS B. McLEAN, OF MANSFIELD, OHIO.

CLIP.

No. 897,645.   Specification of Letters Patent.   Patented Sept. 1, 1908.

Application filed August 26, 1907. Serial No. 390,092.

*To all whom it may concern:*

Be it known that I, ANDRUS B. MCLEAN, citizen of the United States, residing at Mansfield, in the county of Richland and State of Ohio, have invented certain new and useful Improvements in Clips, of which the following is a specification.

My invention relates to clips and comprises means of securely and rigidly fastening diamond or similar shaped teeth to a channel tooth bar or the like.

The invention primarily consists of the application of a clamping device with a bolt having a diamond shaped or similar orifice formed in the head and combined with the U or channel bar to rigidly retain the teeth in place and prevent lateral movement or displacement after adjustment.

Figure 1:
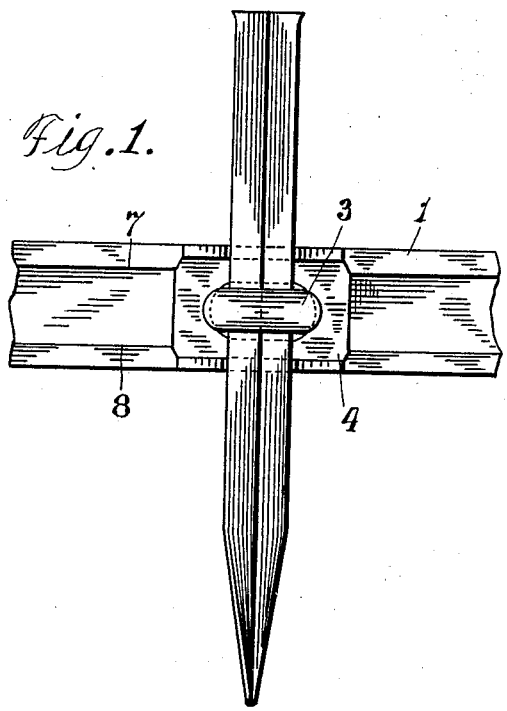
Figure 2:
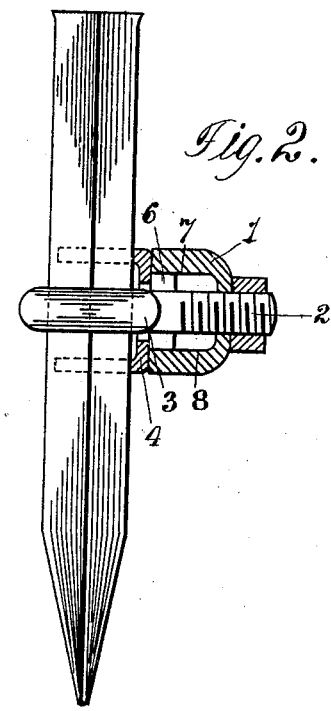
Figure 3:
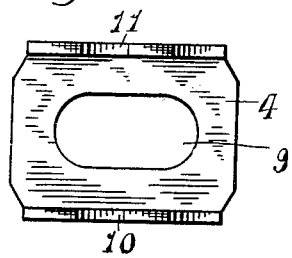
Figure 6:
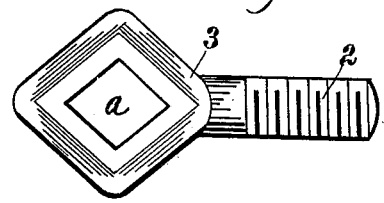
Figure 4:
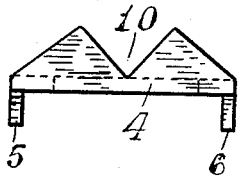
Figure 5:
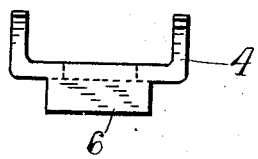

In the drawings, Figure 1 represents a side elevation of a section of a U bar showing the application of my clamping device or clip with the tooth clamped to a section of a U or channel bar. Fig. 2 is a cross-sectional view of Fig. 1. Fig. 3 is a view of the clip showing the relative positions of the elongated slot and notches. Fig. 4 is a view of the clip showing the relative position of the rearwardly projecting ears to the notches. Fig. 5 is an end view of the clip. Fig. 6 is a plan view of the bolt.

In the construction of my device, I prefer to use a channel bar 1. The channel bar is provided with suitable apertures in which the threaded end 2 of the eye-bolt 3 is inserted. I provide a clamping device 4, having rearwardly projecting ears 5 and 6 adapted to fit the walls 7 and 8 of the channel bar to prevent lateral displacement of the clamping device.

An elongated slot 9 is formed in the central portion of the clamping device and alined with the aperture formed in the U bar. This permits the rear portion of the eye (a) of the bolt 3 to enter the slot so that the angular shank of the tooth can be brought in close contact with the notches 10 and 11 thereby rigidly securing the tooth at any point of its vertical adjustment.

It will be observed that the rearwardly projecting ears prevent the lateral displacement of the clamping device and when the nut is drawn tight, forcing the angular surfaces of the tooth in contact with the notches, the teeth are rigidly held in a vertical position.

I prefer to construct the clamping device of pressed steel but it is obvious that it can be made of other material if desired.

Having fully described my invention, what I claim and desire to secure by Letters Patent is:

1. The combination of a channel bar and a clip having an elongated slot formed therein, rearwardly projecting ears adapted to fit within the walls of said channel bar formed on said clip, sid clip being also provided with forwardly projecting members having notches formed therein for clamping purposes.

2. The combination of a channel bar and a clamping device comprising a body portion having rearwardly projecting ears adapted to fit within the walls of said channel bar and forwardly extending members with notches formed therein for clamping purposes.

3. The combination of a channel bar and a clip having an elongated aperture formed in the central portion, rearwardly projecting ears formed on each end of said clip and adapted to fit within the walls of said channel bar, forwardly projecting notched members extending from the side of the clip for clamping purposes.

4. The combination of a channel bar and a clip having an aperture provided therein, rearwardly projecting ears formed on said clip and adapted to fit within the walls of the channel bar, forwardly extending side members having notches formed therein for clamping purposes, means to securely retain a tooth in contact with said notches.

5. The combination of a channel bar and a clamping device comprising a body portion with rearwardly extending ears fitting within the walls of the channel bar and forwardly extending side portions provided with notches therein receiving a harrow tooth, a bolt having an eye formed thereon receiving a harrow tooth, said bolt passing through apertures in the clamping device and channel bar, a nut securely retaining the tooth in position substantially as described and set forth.

6. The combination of a channel bar and a clip with an aperture formed therein, said clip having rearwardly projecting ears formed on each end and adapted to fit within the walls of the bar to prevent lateral displacement, forwardly extending portions formed on the sides and provided with notches, said channel bar provided with an aperture, a bolt passing through said aperture and the base of the clip for clamping purposes, a tooth fitted to the eye of the bolt and means whereby the tooth is forced in frictional contact with the notches of the clip and retained in any adjusted position as described and set forth.

7. The combination of a channel bar and a clip provided with rearwardly projecting ears adapted to fit within the walls of the channel bar, and outwardly extending side members having notches formed therein to engage with a tooth, a bolt having an eye formed in one end to receive a tooth with means on the opposite end to bring the tooth in frictional contact with the notches and securely hold said tooth in place.

In testimony whereof I affix my signature in presence of two witnesses.

ANDRUS B. McLEAN.

Witnesses:
 B. F. WILLIAMS,
 ZORA E. PATTERSON.